United States Patent [19]
Iso et al.

[11] Patent Number: 5,894,670
[45] Date of Patent: Apr. 20, 1999

[54] ELECTRIC SHAVING SYSTEM

[75] Inventors: Takeshi Iso; Teruo Hishiki, both of Tokyo, Japan

[73] Assignee: U.S. Philips Corporation, New York, N.Y.

[21] Appl. No.: 08/957,110

[22] Filed: Oct. 24, 1997

[30] Foreign Application Priority Data

Dec. 13, 1996 [JP] Japan ................... 8-353029

[51] Int. Cl.$^6$ ................... B26B 19/38
[52] U.S. Cl. ................... 30/541; 30/537; 206/351; 206/459.1; 340/825.22; 340/825.72
[58] Field of Search ................... 30/41.7, 41.8, 30/537, 541, DIG. 1, DIG. 2; 340/310.01, 825.22, 825.72, 568; 206/351, 459.1

[56] References Cited

U.S. PATENT DOCUMENTS

| | | | |
|---|---|---|---|
| 2,474,899 | 7/1949 | Hutt | 30/541 |
| 3,138,866 | 6/1964 | Ressler | 30/41.7 |
| 3,257,599 | 6/1966 | Somers et al. | |
| 5,189,412 | 2/1993 | Mahta et al. | |
| 5,240,107 | 8/1993 | Casale | 30/41.7 |

FOREIGN PATENT DOCUMENTS

19612089 A1  10/1997  Germany.

*Primary Examiner*—Hwei-Siu Payer
*Attorney, Agent, or Firm*—Ernestine C. Bartlett; Norman N. Spain

[57] ABSTRACT

A shaving system with two main components: an electric shaver and a remote device which has a display unit for presenting specific data to the user. The remote device may further comprise a mirror. The mirror and the display unit may be combined to form a single unit. The display unit may be incorporated in the mirror, which for this purpose may be implemented as a partly transparent mirror with the display unit mounted on the backside of the mirror. Additionally, the remote device may perform the function of charging stand for a rechargeable battery of the shaver. In that case the remote device has a docking bay for receiving the shaver. The shaver's battery is charged via electrical contacts between the remote device and the electric shaver, or by means of coils in the remote device and the shaver. The display unit displays status information of the shaver and provides feedback to the user during shaving. The remote device may further be implemented with knobs, buttons or slide controls to adjust shaving parameters in the shaver. Also environmental sensors may be incorporated in the remote device to inform the electric shaver of information relevant to shaving comfort. The data exchange between the remote device and the electric shaver is performed through wireless communication, which for some functions is a two-way communication.

8 Claims, 3 Drawing Sheets

ELECTRIC SHAVING SYSTEM

BACKGROUND OF THE INVENTION

The present invention relates to an electric shaving system. An electric shaver is known in which the remaining battery capacity is displayed on the electric shaver body by means of a liquid crystal display mounted on the shaver body. In this known electric shaving system the user cannot verify the present state of the electric shaver in use, for example, the information such as a pressure with which the electric shaver blade presses the user's skin. This is because even if the information such as the pressure is displayed on the electric shaver body itself, like the remaining battery capacity, it is difficult for the user to see the electric shaver body during the time when the user is using the electric shaver.

Another electric shaving system consisting of an electric shaver body and a charging box or stand is known. Such a system makes it possible to reduce the number of parts in the shaver body. Such a system further allows the electric shaver body to be washed with water. The charging box or stand carries out charging of the shaver battery with the electric shaver fitted therein. Since the electric shaver used for the known electric shaving system is electrically connected to the charging box, it has a plurality of exposed terminals such as a charging terminal and a control terminal. This presents a problem in that when the electric shaver is washed with water, the plural exposed terminals are corroded electrically. Also, the charging box from the known shaving system has a problem in that if a metallic object such as a pin accidentally enters the charging box, erroneous charging is carried out.

SUMMARY OF THE INVENTION

The present invention was made in view of the drawbacks of the known shaving systems, and accordingly an object thereof is to provide an electric shaving system with an improved and better display unit which offers more comfort to the user. A further object of the present invention is to provide an electric shaving system having an electric shaver that can be washed with water without the occurrence of electric corrosion and can be charged without malfunction.

The electric shaving system in accordance with the present invention comprises an electric shaver and a separate remote device. The system further comprises means for enabling wireless communication between the electric shaver and the remote device, and wherein the remote device comprises a display unit for displaying at least one shaving parameter of the shaver. In this way the user can view the state of the shaver at a location remote from the user. The remote device may be advantageously combined with a mirror, so that the user can see himself together with the display unit.

The mirror may be implemented as a partly transparent mirror with a viewing side, whereas the display unit is disposed at the other side of the mirror remote from the viewing side. In this way the data displayed by the display unit is visible through the mirror and the user need not to divert his eyes from the mirror in order to look at the data of the display unit.

The display unit may be a LED-type display which is mounted on the backside of the shaver-mirror through a diffusor plate of suitable thickness. The LED-display thus becomes invisible when the LED is off.

The remote device may be implemented as an electric shaver stand for charging a rechargeable battery in the electric shaver when the electric shaver is placed in the electric shaver stand, and each of said electric shaver and said electric shaver stand may comprise means for enabling two-way wireless communication between the electric shaver and the electric shaver stand.

Each of said electric shaver and said electric shaver stand may comprise at least one light emitting device and at least one light receiving device for enabling the two-way communication by said light emitting devices and light receiving devices between the electric shaver and the electric shaver stand.

By using two-way wireless communication, for example a combination of the light emitting device and the light receiving device, the need for exposed terminals is reduced or even eliminated, so that electric corrosion does not take place in the electric shaver. Also, by the two-way communication, the electric shaver stand does not continue to charge unless a charge request signal is sent from the electric shaver to the electric shaver stand. Therefore, the electric shaver stand does not receive the charge request signal even if a metallic pin or the like enters the electric shaver stand, so that erroneous charging can be prevented.

In a preferred embodiment the electric shaver stand comprises a primary coil and the electric shaver comprises a secondary coil for transferring alternating current from the electric shaver stand to the electric shaver when the electric shaver is placed in the electric shaver stand. In this way not only the communication between the shaver and the stand, but also the charge current transfer from stand to shaver can be accomplished without electrical contacts.

Further, the electric shaver stand in accordance with the present invention may comprise a display panel for displaying at least one state of electric shaver. A signal indicative of the state of electric shaver is sent from the electric shaver to the electric shaver stand. The user of the electric shaver can verify the present state of electric shaver by using the display panel.

The wireless communication further makes possible that the remote device comprises means for adjusting one or more shaving parameters of the electric shaver by means of the wireless communication between the electric shaver and the remote device. In this way shaving parameters of the electric shaver, for example the skin type of the user, can be adjusted or selected by means of suitable buttons, levers, etc. mounted on the remote device. It is further possible to send environmental data, for example temperature and moisture of the air, from the remote device to the shaver in order to adapt set points in the control system of the shaver.

DETAILED DESCRIPTION OF THE PREFERRED EMBODIMENTS

Embodiments of the present invention will be described in detail with reference to the accompanying drawings.

The shaving system has two main components: an electric shaver and a remote device which has a display unit for giving specific data to the user. The remote device may further comprise a mirror. The mirror and the display unit may be combined to form a single unit. The display unit may be incorporated in the mirror, which for this purpose may be implemented as a partly transparent mirror with the display unit mounted on the backside of the mirror. Additionally, the remote device may perform the function of charging stand for a rechargeable battery of the shaver. In that case the remote device has a docking bay for receiving the shaver. The shaver's battery is charged via electrical contacts between the remote device and the electric shaver, or by means of coils in the remote device and the shaver. The display unit displays status information of the shaver and provides feedback to the user during shaving. The remote device may further be implemented with knobs, buttons or slide controls to adjust shaving parameters in the shaver. Also environmental sensors may be incorporated in the remote device to inform the electric shaver of information relevant to shaving comfort. The data exchange between the remote device and the electric shaver is performed through wireless communication, which for some functions is a two-way communication. The following is an exemplary example of a possible implementation of the shaving system according to the invention.

Figure 1:
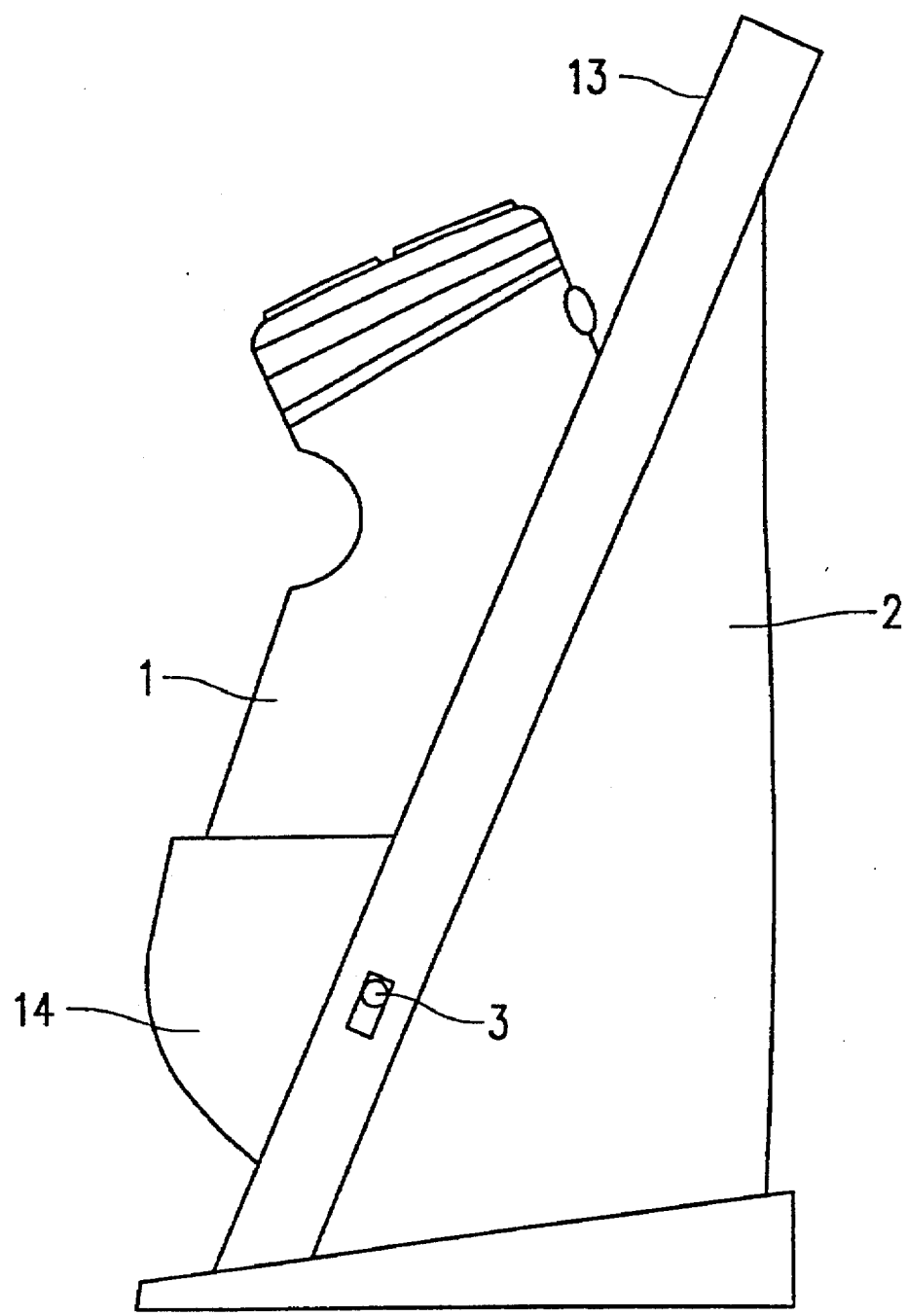
FIG. 1 is a side view showing an electric shaver and an electric shaver stand used according to the present invention.
Figure 2:
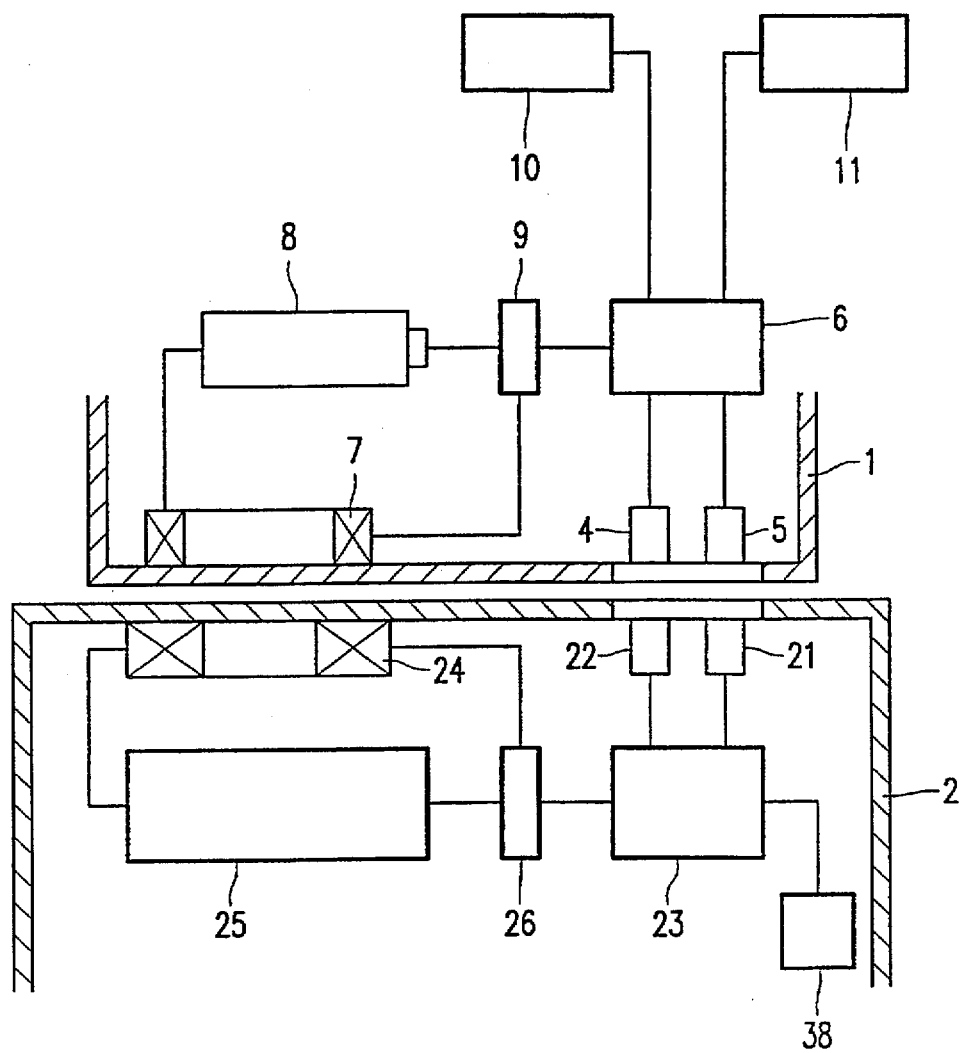
FIG. 2 is a block diagram schematically showing the interior of a part of the electric shaver and a part of the electric shaver stand shown in FIG. 1.

FIG. 1 is a side view showing an electric shaving system formed with an electric shaver 1 and an electric shaver stand 2 in accordance with the present invention. FIG. 2 is a view schematically showing a part of the electric shaver 1 and a part of the electric shaver stand 2. Like FIG. 1, this figure shows a state in which the electric shaver 1 is placed in the electric shaver stand 2.

The electric shaver 1 has shaver blades (not shown), a light receiving device 5 for receiving infra-red rays emitted from the electric shaver stand 2, a light emitting device 4 for emitting infra-red rays to the electric shaver stand 2, a secondary coil 7, a battery 8 connected to the secondary coil 7, a remaining battery capacity detecting circuit 9 for detecting the remaining amount of electric power stored in the battery 8, a pressure detecting circuit 10 for detecting a pressure applied to the shaver blade when the shaver blade is in contact with the skin during shaving, and a shaver blade angle detecting circuit 11 for detecting an angle between the skin and the shaver blade when the shaver blade is in contact with the skin during shaving. The light receiving device 5, light emitting device 4, pressure detecting circuit 10, angle detecting circuit 11, and remaining battery capacity detecting circuit 9 are connected to a microcomputer 6. The battery 8 is connected to the secondary coil 7 via the remaining battery capacity detecting circuit 9.

The light receiving device 5 receives infra-red rays emitted from the electric shaver stand 2, converts them into an electrical signal, and sends the electrical signal to the microcomputer 6. The light emitting device 4 converts an electrical signal sent from the microcomputer 6 into infra-red rays, and sends information from the microcomputer 6 to the electric shaver stand 2.

The electric shaver 1 has, for example, three shaver blades. Each shaver blade has a spring. By controlling a pressure applied to this spring, a pressure applied to the skin by each shaver blade is controlled. As the pressure applied to the spring increases, heavier shaving can be done. For a spring mechanism provided on the shaver blade reference is made to European Patent Application No. EP 0 720 523 the contents of which correspond to U.S. application Ser. No. 455,613, filed May 31, 1995 and now U.S. Pat. No. 5,687,481. The pressure detecting circuit 10 detects the pressure applied to the spring of the shaver blade by using, for example, a pressure sensor, and sends this pressure information to the microcomputer 6. When the electric shaver 1 has, for example, three shaver blades, the pressure information for each shaver blade is sent to the microcomputer 6. The microcomputer 6 can calculate a strength with which the shaver blade is in contact with the skin. The angle detecting circuit 11 detects an angle between the skin and the shaver blade when the shaver blade is in contact with the skin during shaving, and sends this angle information to the microcomputer 6. When the shaver blade is in contact with the cheek, this angle is substantially zero. When the shaver blade is in contact with the chin, this angle may be large. The microcomputer 6 judges which portion of the skin the shaver blade is in contact with, on the basis of the aforesaid angle information.

The battery 8 is charged by an electric current generated by the secondary coil 7 so that the shaver blades of the electric shaver 1 are rotated or the electric circuits such as the microcomputer 6 are operated by the electric power stored in the battery 8. The remaining battery capacity detecting circuit 9 detects the remaining battery capacity of the battery 8, and sends the remaining battery capacity information to the microcomputer 6. The method for detecting the remaining battery capacity is not explained because it is already known to persons skilled in the art. The microcomputer 6 can send the remaining battery capacity information to the electric shaver stand 2 via the light emitting device 4. Further, the microcomputer 6 can measure the working time of the electric shaver 1 by the remaining battery capacity information or by measuring the time for which the shaver blades are driven. The microcomputer 6, using the working time of the electric shaver 1, can send beard dust cleaning information that beard dust accumulated in the electric shaver 1 should be cleaned off or shaver blade cleaning information that the shaver blades should be cleaned to the electric shaver stand 2 via the light emitting device 4.

The electric shaver stand 2 comprises a light receiving device 22 for receiving infra-red rays emitted from the electric shaver 1, a light emitting device 21 for emitting infra-red rays to the electric shaver 1, a microcomputer 23, a display panel 13, a primary coil 24, a primary coil oscillating circuit 25 for oscillating the primary coil 24, a current detecting circuit 26 for detecting the electric current flowing in the primary coil 24, and a skin type lever 3 for selecting light shaving and heavy shaving by user's preference.

The light receiving device 22, light emitting device 21, and current detecting circuit 26 are connected to the microcomputer 23. Further, the microcomputer 23 is also connected to the skin type lever 3 via a position sensor (not shown) for detecting the position of the skin type lever 3. The current detecting circuit 26 is connected to the primary coil oscillating circuit 25 and the primary coil 24. Further, the primary coil oscillating circuit 25 is also connected to the primary coil 24.

Like the description of the electric shaver 1, the light receiving device 22 receives infra-red rays emitted from the electric shaver 1, converts them into an electrical signal, and sends the electrical signal to the microcomputer 23. The light emitting device 21 converts an electrical signal sent from the microcomputer 23 into infra-red rays, and sends them to the electric shaver 1. The current detecting circuit 26 detects the electric current flowing in the primary coil 24, and sends this electric current information to the microcomputer 23. Based on this electric current information, the microcomputer 23 judges whether or not the primary coil oscillating circuit 25 can be driven. The primary coil oscillating circuit 25, receiving a command from the microcomputer 23, oscillates the primary coil 24.

Figure 3:
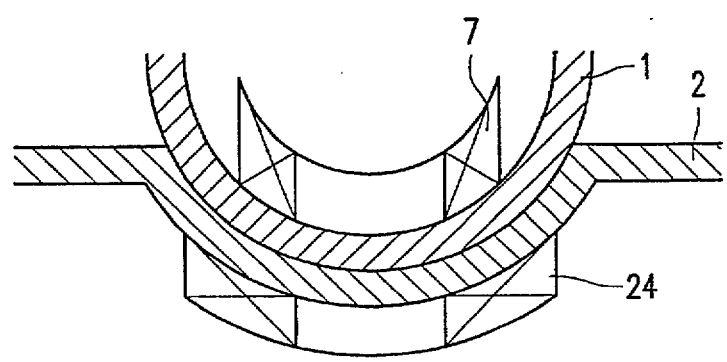
FIG. 3 is a sectional view of a secondary coil in the electric shaver and a primary coil in the electric shaver stand used in an embodiment of the present invention.

The light emitting device 4, light receiving device 5, and secondary coil 7 are arranged in the vicinity of the bottom of the electric shaver 1. In FIG. 1, the bottom portion of the electric shaver 1 is covered by a cover 14 of the electric shaver stand 2 for holding the electric shaver 1. The light emitting device 21, light receiving device 22, and primary coil 24 are arranged in the vicinity of this cover 14. The electric shaver stand 2 may have another light emitting device and light receiving device located away from the cover 14. These light emitting device and light receiving device assures two-way communication between the electric shaver 1 and the electric shaver stand 2 when the electric shaver 1 is obstructed by the cover 14 during the time when the user is using the electric shaver 1. FIG. 3 is a sectional view of the secondary coil 7 lying in the electric shaver 1 and the primary coil 24 lying in the electric shaver stand 2, viewed from the bottom of the cover 14. Each of the primary coil 24 and the secondary coil 7 shown in FIG. 3 is formed into a curved shape. Therefore, the distance between the secondary coil 7 and the primary coil 24 is substantially constant over the total length and can be made short. Thereby, the efficiency of power transmission to the secondary coil 24 can be improved, so that the transmitted power to the primary coil 24 can be reduced, resulting in an effect that the power consumption can be lowered.

The following is a description of a method for charging the electric shaver body by using two-way infra-red ray communication. The electric shaver stand 2 has a plug for outlet (not shown), and the plug is inserted into a household outlet. The electric shaver 1 is not yet inserted in the electric shaver stand 2. In this case, the microcomputer 23 allows a small electric current for standby of, for example, 1 mA to flow intermittently and periodically in the primary coil 24 by means of the primary coil oscillating circuit 25. The period is such that the current flows for 3 seconds and does not flow for 0.2 second, for example. This electric current information is sent to the microcomputer 23 through the current detecting circuit 26. Because the primary coil current is small, the microcomputer 23 judges that the electric shaver 1 is not inserted in the electric shaver stand 2. Next, when the electric shaver 1 is inserted in the electric shaver stand 2, the secondary coil 7 of the electric shaver 1 faces the primary coil 24 of the electric shaver stand 2 as shown in FIGS. 2 and 3. The electromagnetic induction by the influence of the secondary coil 7 allows a relatively large electric current of, for example, 5 mA to flow in the primary coil 24. This electric current information is sent to the microcomputer 23 through the current detecting circuit 26. The microcomputer 23, judging that the primary coil current has become large, drives the primary coil oscillating circuit 25 so that the primary coil current flows continuously. Since the primary coil current of 5 mA flows continuously, a large amount of current of, for example, 300 mA is generated in the secondary coil 7 of the electric shaver and flows continuously. The secondary current from the secondary coil 7 is used to charge the battery 8. The primary coil oscillating circuit 25 continues to be driven for the time elapsing from when no electric power is stored in the battery 8 to when electric power high enough to drive the microcomputer 6 etc. of the electric shaver 1 is stored in the battery 8, for example, at least for two minutes. The microcomputer 23 calculates the time elapsing from when the primary coil oscillating circuit 25 begins to operate, and after two minutes, the microcomputer 23 stops the operation of the primary coil oscillating circuit 25. The microcomputer 6 etc. are activated by the electric power stored in the battery 8. A charge request signal is sent from the microcomputer 6 to the electric shaver stand 2 via the light emitting device 4. The microcomputer 23 of the electric shaver stand 2 receives the charge request signal via the light receiving device 22. The microcomputer 23 informs the microcomputer 6 via the light emitting device 21 and the light receiving device 5 of the receipt of this charge request signal, as an acknowledge signal. After sending this acknowledge signal, the microcomputer 23 drives the primary coil oscillating circuit 25 again. The microcomputer 23 stops the operation of the primary coil oscillating circuit 25 after driving it for two minutes again, sends the acknowledge signal again to the microcomputer 6 on receipt of the charge request signal from the microcomputer 6. This series of operations is continued until the battery 8 is fully charged.

The time for the second and subsequent driving of the primary coil oscillating circuit 25 can be set arbitrarily after the microcomputer 6 is activated. The microcomputer 6 detects a fully charged state by means of the remaining battery capacity detecting circuit 9, and sends the detected information, instead of the aforesaid request signal, to the microcomputer 23 via the light emitting device 4 and the light receiving device 22 as a full charge signal. The microcomputer 23 stops the operation of the primary coil oscillating circuit 25 after sending the acknowledge signal to the microcomputer 6. Subsequently, the operation of the primary coil oscillating circuit 25 may be stopped until the request signal is sent again from the microcomputer 6. Alternatively, this operation time is made very short, and the communication time of the full charge signal and request signal between the microcomputer 6 and the microcomputer 23 other than the operation time is made long, by which this cycle may be repeated.

As described above, during the operation of the primary coil oscillating circuit 25, the microcomputer 6 and the microcomputer 23 do not communicate with each other via the light emitting device and the light receiving device. This prevents malfunction of the infra-red ray communication caused by the influence of electromagnetic induction produced in the primary coil 24 and the secondary coil 7. If a metallic object other than the electric shaver 1 enters the cover 14 of the electric shaver stand 2, a large current of, for example, 5 mA or larger sometimes flow likewise in the primary coil 24. The microcomputer 23 drives the primary coil oscillating circuit 25 according to the current information from the current detecting circuit 26, and a current of, for example, 5 mA flows in the primary coil continuously for two minutes. However, since the microcomputer 23 does not receive the request signal from the light receiving device 22, the acknowledge signal is not generated from the light emitting device 21. Therefore, the primary coil oscillating circuit 25 is not driven again, so that malfunction such that the current in the primary coil continues to flow accidentally can be prevented.

The primary coil and the secondary coil enable transfer of charge current from the shaver stand 2 to the shaver 1 without electric contacts. It should be clear that charge current transfer via electrical contacts is also possible. In that case the stand comprises a controllable current source driven by the microcomputer 23 in a similar fashion as described above.

The communication between the shaver 1 and the electric stand 2 may also be implemented with other wireless communication means, such as radio transmission or ultra sound transmission. The primary coil and the secondary coil can also be used as transmitting and receiving antennas in case of radio transmission.

Figure 4:
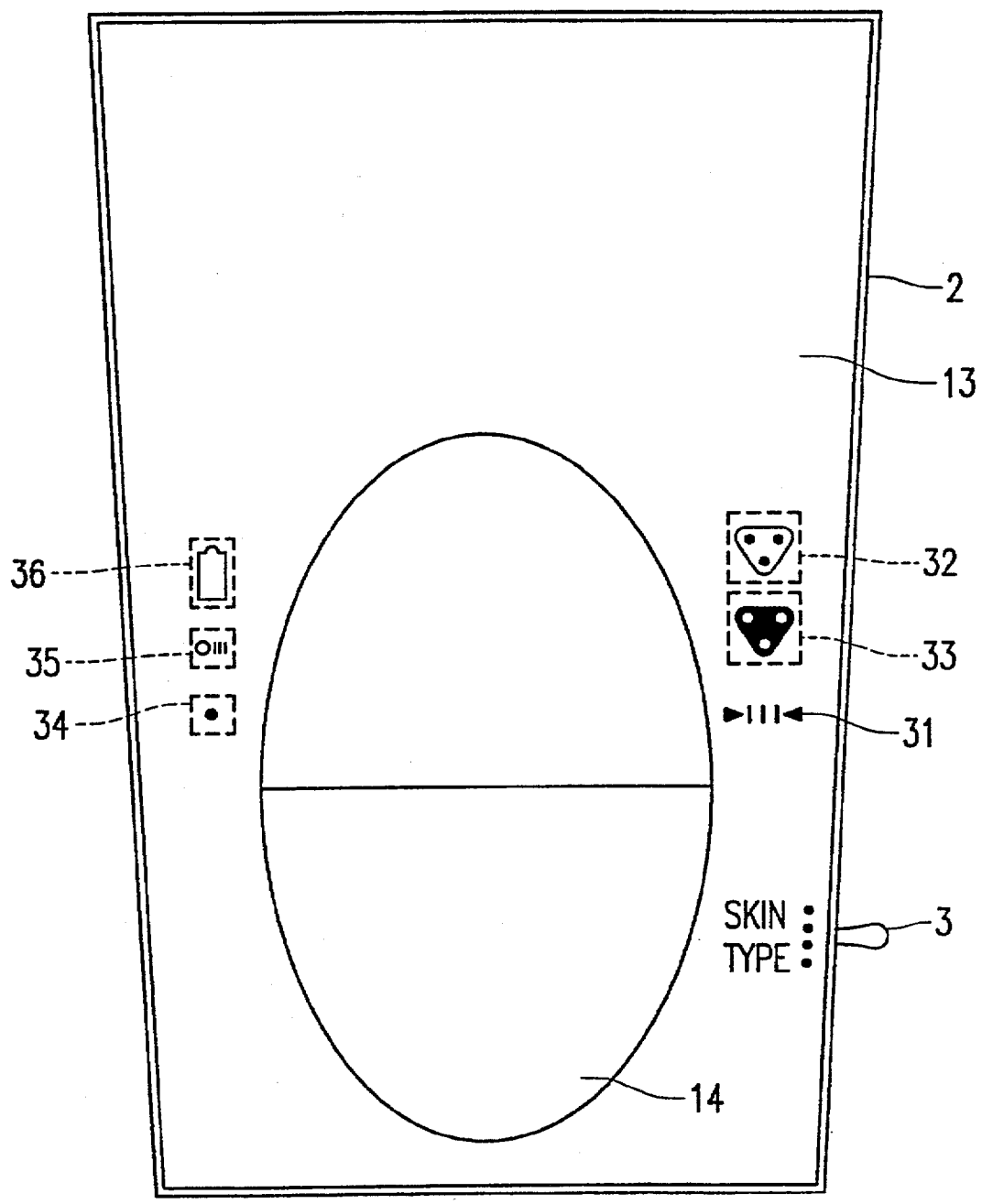
FIG. 4 is a front view of the electric shaver stand shown in FIG. 1.

FIG. 4 is a front view of the electric shaver stand 2, showing the display panel 13, cover 14 and skin type lever 3. The display panel 13, having a shaver blade pressure display 31, power switch display 34, infra-red ray drive display 35, remaining battery capacity display 36, beard dust cleaning display 33, and shaver blade cleaning display 32, is made of a partly transparent mirror. On the back of each display, an LED is disposed via a diffusion plate (not shown). By providing an appropriate distance of, for example, about 1 to 2 mm between the half mirror and the diffusion plate, the display is invisible when the LED is off, so that the surface of the display panel can be used as a mirror. When the LED comes on, the display of the lighted portion is illuminated, so that the user of the electric shaver 1 can verify this display. The diffusion plate is used to diffuse the light of LED to make the LED itself invisible to the user.

First, the displays on the display panel 13 will be explained. The electric shaver stand 2 is plugged into a household outlet. The power switch display 34 comes on, showing that the electric shaver stand 2 is energized. It is assumed that the electric shaver 1 and the electric shaver stand 2 are at a distance such that two-way communication is possible, and that the battery 8 has been charged enough for doing the two-way communication. Each time the two-way communication between the electric shaver 1 and the electric shaver stand 2 is activated, the infra-red ray drive display 35 comes on. The remaining battery capacity display 36 may display the amount of electric power remaining in the battery 8 of the electric shaver 1, or may give a display for an alarm only when the remaining battery capacity of the battery 8 is low. The beard dust cleaning display 33 is used for an alarm to tell that beard dust should be cleaned off when it accumulates in the electric shaver 1. The shaver blade cleaning display 32 is used for an alarm to tell that the shaver blades should be cleaned after the shaver blades have been used for a long period of time. The shaver blade pressure display 31 indicates a pressure with which the shaver blade is in contact with the skin during the time when the user is using the electric shaver 1.

The skin type lever 3 is a mechanical lever for selecting the mode of shaving, for example, whether the user wants to shave heavily or lightly. The user can control the skin type lever 3 manually according to the user's preference. The skin type lever 3 is connected to the microcomputer 6 via a position sensor (not shown). By the output signal from the position sensor, the microcomputer 6 can judge which mode of shaving is desired by the user. The microcomputer 6 can send the shaving mode information to the electric shaver 1 via the light emitting device 21. It should be clear that in this way also other shaving parameters of the electric shaver can be adjusted or selected by means of suitable buttons, levers, etc. mounted on the stand.

As an example in which the display panel 13 gives a display through the two-way communication between the electric shaver 1 and the electric shaver stand 2, a display process of the shaver blade pressure display 31 will be explained. The shaving mode information obtained from the skin type lever 3 is sent to the microcomputer 6 of the electric shaver 1 via the light emitting device 21 and the light receiving device 5. It is assumed that the user is using the electric shaver 1. The angle information indicative of the angle between the user's skin and the shaver blade is detected by the angle detecting circuit 11 and sent to the microcomputer 6. Also, the pressure information about the pressure applied to the shaver blade when the shaver blade is in contact with the user's skin is detected by the pressure detecting circuit 10 and sent to the microcomputer 6. Based on the pressure information, the microcomputer 6 calculates the actual pressure amount applied to the shaver blade. Further, based on the angle information and the shaving mode information sent from the electric shaver stand 2, the microcomputer 6 calculates the pressure amount applied to the shaver blade, which is desired by the user. As described above, the microcomputer 6 judges from the angle information whether the shaver blade is in contact with the flat cheek portion or with the acute-angled chin portion, and calculates a desired pressure amount necessary for heavy or light shaving depending on which portion of skin the shaver blade is in contact with. As one method for calculating the actual pressure amount or the desired pressure amount, a fuzzy rule may be used. The microcomputer 6 calculates a pressure difference between the actual pressure amount and the desired pressure amount. Based on this pressure difference, the microcomputer 6 controls the strength of the spring of the shaver blade. Similarly, as one method for this control, fuzzy control may be used.

The microcomputer 6 sends information about the pressure difference to the electric shaver stand 2 via the light emitting device 4. The electric shaver stand 2 receives the pressure difference information by means of the light receiving device 22, and displays the pressure difference information by means of the shaver blade pressure display 31 via the microcomputer 23. The user manually controls the strength of shaver blade contact on the user's skin while looking at the shaver blade pressure display 31. For example, if the pressure difference is small, the user tries to keep the present state in which the shaver blade is in contact with the user's skin. If the pressure difference is large, and it is verified from the shaver blade pressure display 31 that the shaver blade is strongly in contact with the user's skin, the user tries to weaken the strength of shaver blade contact on the user's skin. The user can obtain an appropriate contact of the shaver blade of the electric shaver 1 by looking at the shaver blade pressure display 31.

The shaver stand 2 may further comprise environmental sensors 38 (see FIG. 2) which communicate with the microcomputer 6 of the shaver 1 via the microcomputer 23, the light emitting device 21 and the light receiving device 5. In this way environmental data, such as temperature and moisture of the air, can be used in the shaver controlling system to adjust shaving parameters for optimal shaving comfort.

We claim:

1. An electric shaving system comprising an electric shaver and a separate remote device, wherein the system further comprises means for enabling wireless communication between the electric shaver and the remote device, and wherein the remote device comprises a display unit for displaying at least one shaving parameter of the shaver.

2. An electric shaving system as claimed in claim 1, wherein the remote device further comprises a mirror.

3. An electric shaving system as claimed in claim 2, wherein the mirror is a partly transparent mirror having a viewing side, the display unit being disposed at the side of the mirror remote from the viewing side.

4. An electric shaving system as claimed in claim 1 wherein the remote device is implemented as an electric shaver stand for charging a rechargeable battery in the electric shaver when the electric shaver is placed in the electric shaver stand, and each of said electric shaver and said electric shaver stand comprises means for enabling two-way wireless communication between the electric shaver (10 and the electric shaver stand.

5. An electric shaving system as claimed in claim 4, wherein each of said electric shaver and said electric shaver stand comprises at least one light emitting device and at least one light receiving device for enabling the two-way communication by said light emitting devices and light receiving devices between the electric shaver and the electric shaver stand.

6. An electric shaving system as claimed in claim 4, wherein the electric shaver stand comprises a primary coil and the electric shaver comprises a secondary coil for transferring alternating current from the electric shaver stand to the electric shaver when the electric shaver is placed in the electric shaver stand.

7. An electric shaving system as claimed in claim 1, wherein the remote device comprises means for adjusting at least one shaving parameter of the electric shaver by means of the wireless communication between the electric shaver and the remote device.

8. An electric shaving system as claimed in claim 1, wherein the remote device comprises sensing means for sensing at least one environmental parameter, a control signal being transmitted to the electric shaver by means of the wireless communication in response to the sensing means.

* * * * *